Jan. 20, 1931.   J. F. SCHULTZ   1,789,780
DEVICE FOR ADJUSTING CULTIVATOR SHIELDS
Filed Aug. 25, 1928   2 Sheets-Sheet 1
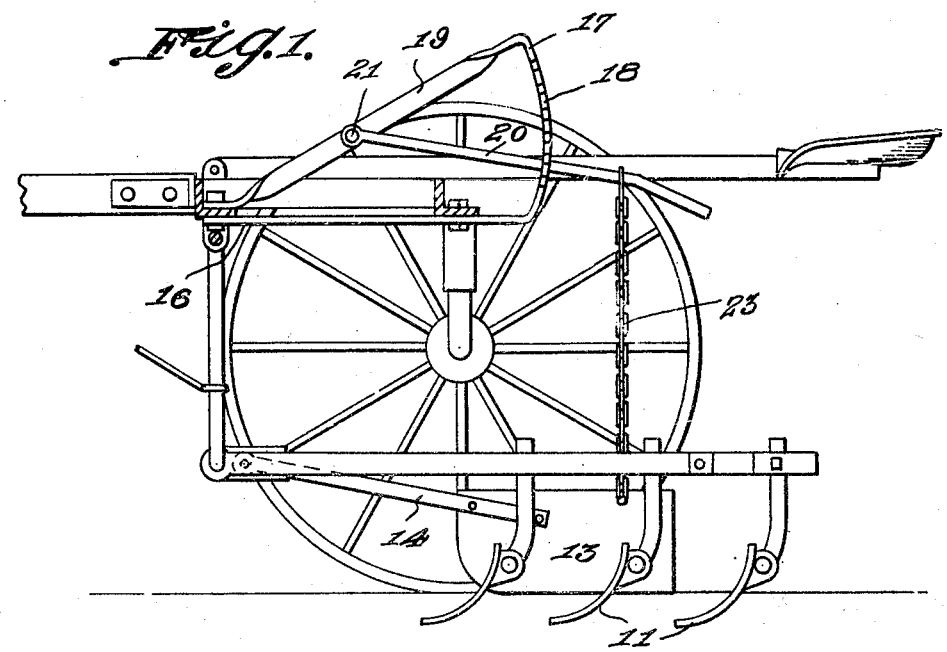
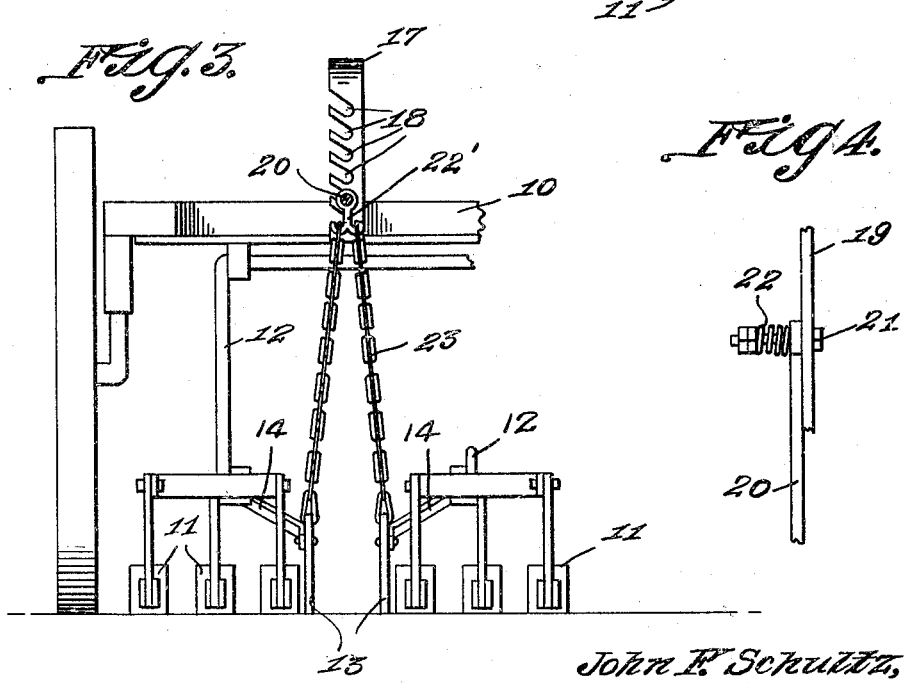
John F. Schultz,
INVENTOR
BY Victor J. Evans
ATTORNEY Jan. 20, 1931. J. F. SCHULTZ 1,789,780
DEVICE FOR ADJUSTING CULTIVATOR SHIELDS
Filed Aug. 25, 1928 2 Sheets-Sheet 2

Patented Jan. 20, 1931

1,789,780

UNITED STATES PATENT OFFICE

JOHN FREDRICK SCHULTZ, OF WALTON, NEBRASKA

DEVICE FOR ADJUSTING CULTIVATOR SHIELDS

Application filed August 25, 1928. Serial No. 302,075.

This invention has for an object a supporting structure for cultivator shields.

Another object of the invention contemplates swinging mountings for the shields.

An additional object of the invention comprehends an operating lever adapted for connection with the free ends of the shields.

More specifically stated the supporting structure is provided with a segment adapted to accommodate the operating lever whereby the shields may be disposed at desired positions.

With the above and other objects in view, the invention further consists in the following novel features and details of construction, to be hereinafter more fully described, illustrated in the accompanying drawings and pointed out in the appended claim.

In the drawings:—

Figure 1 is a horizontal sectional view taken through a cultivator illustrating the application of the invention thereon.

Figure 3 is a rear elevation of the adjusting apparatus for the shields.

Figure 4 is a detail view taken of the mounting for the operating lever.

Figure 2:
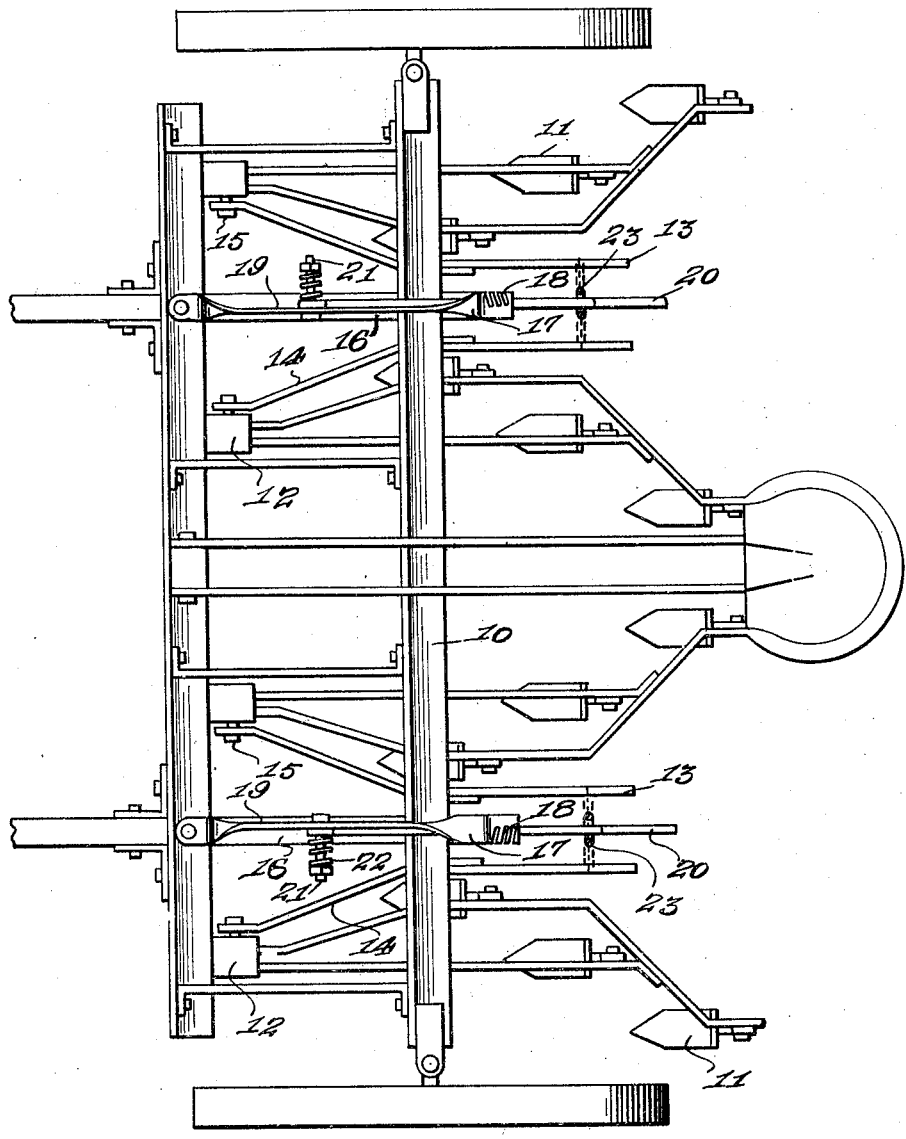
Figure 2 is a top plan view of the cultivator and the present invention.

Referring to the drawings in detail, wherein like characters of reference denote corresponding parts, the reference character 10 indicates generally a cultivator having shovels 11 connected with the lifting apparatus 12, whereby the shovels may be raised and lowered.

The shields, as mentioned in the foregoing, and as indicated at 13, are adapted for connection with levers 14 pivotally mounted, as indicated at 15, upon the lifting apparatus 12 of the cultivator.

The adjusting apparatus contemplates a plate member 16 secured at one end to the under sides of the horizontal beams of the cultivator and upstanding at its opposite end to provide a curved portion 17. Said portion is provided with a multiplicity of outwardly, upwardly and obliquely disposed slots 18, the purpose of which will be presently apparent. An extension 19, projected from the uppermost end of the curved portion 17 is successively twisted upon itself and ultimately connected at the foremost end thereof with the upper side of a horizontal beam upon the cultivator and immediately above the connection of the bar 16 therewith, substantially as illustrated in Figure 1 of the drawings.

An operating lever 20, pivotally mounted, as indicated at 21, upon the bar 19, is adapted for reception within any one of the plurality of slotted portions 18 in the curved portion 17, which will be hereinafter referred to as the segment. A compression spring 22 is employed upon the pivot connection 21 to shift the operating lever 20 against the adjacent side of the bar 19 whereby accidental displacement of said lever will be obviated.

A double hook member 22′, carried upon the operating lever 20, is adapted for connection with the uppermost links of chains 23 having connection at their lowermost ends with the rearmost free ends of the shields 13. If desired, a multiplicity of shields and adjusting apparatus therefor may be included upon cultivators of different sizes and types.

The aforementioned construction will permit raising and lowering of the shields pursuant to the depth set for the shovels of the cultivator and the condition of the soil surface. The shields may be effectively applied for use and in conjunction with cultivators while working new corn to prevent the earth or soil from piling up or hilling the plants wherein it is desired to keep the soil away from the stalks at the particular period of growth. After the plants have attained a certain age, the shields may either be taken off or elevated whereby the shovels will hill the soil about the stalks or roots of the plants.

The invention is susceptible of various changes in its form, proportions and minor details of construction, and the right is herein reserved to make such changes as properly fall within the scope of the appended claim.

Having thus described the invention, what is claimed is:—

An adjusting device for cultivator shields comprising a segment having an extension mounted upon the cultivator, a plate member projected from the opposite end of the segment having connection at intervals with the cultivator, an operating lever pivotally mounted upon the extension for detachable locking connection with the segment proper, a double hook member mounted for lateral swinging motion upon an extended portion of the operating lever, and chains establishing connection at their ends with a double hook member and the rearmost free ends of the shields.

In testimony whereof I affix my signature.

JOHN FREDRICK SCHULTZ.